(12) United States Patent
Lin et al.

(10) Patent No.: US 6,280,524 B1
(45) Date of Patent: Aug. 28, 2001

(54) APPARATUS AND METHOD FOR COATING FLUORESCENT POWDER ON A FLAT PANEL

(75) Inventors: Shieh-Hsien Lin; Jen-Yun Huang; Lung-Tsai Kuang, all of Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/366,910

(22) Filed: Aug. 4, 1999

(51) Int. Cl.[7] ................................ B05C 5/02; B05B 5/00
(52) U.S. Cl. .................... 118/627; 118/620; 118/621; 427/157
(58) Field of Search ........................... 118/620, 621, 118/627; 427/157, 457, 158

(56) References Cited

U.S. PATENT DOCUMENTS 4,321,281 * 3/1982 Itoh ..................................... 427/33

FOREIGN PATENT DOCUMENTS 55-64864 * 5/1980 (JP) .

* cited by examiner

Primary Examiner—Richard Crispino
Assistant Examiner—Y. Tadesse
(74) Attorney, Agent, or Firm—Tung & Associates

(57) ABSTRACT

An apparatus for electrostatically coating powder on a flat panel and a method for using such apparatus are provided. In the apparatus, a heating device is used to heat a panel to be coated and positioned on a powder spray chamber to a temperature of at least 100° C. and simultaneously charging the panel with a negative voltage of at least 20,000 volts. The high temperature and the high voltage of the otherwise non-conductive panel result in a panel that is electrostatically conductive. Powder particles that are charged with a high positive voltage are then injected toward the panel surface by an air pressure of at least 0.8 kg/cm$^2$ until particles are adhered to the panel surface. The present invention novel method can be used advantageously at low costs due to its simple processing steps and as an environmentally friendly process since no solvent needs to be evaporated and released into the atmosphere. The present invention novel method further provides a low cost method for fabricating flat panel display devices due to its simplified processing steps.

17 Claims, 3 Drawing Sheets

APPARATUS AND METHOD FOR COATING FLUORESCENT POWDER ON A FLAT PANEL

FIELD OF THE INVENTION

The present invention generally relates to an apparatus and a method for coating a powder material on a flat panel and more particularly, relates to an apparatus and a method for coating a fluorescent powder on a substantially flat, non-electrically conducting panel by an electrostatic coating method in which the panel is heated and negatively charged by a gas flame.

BACKGROUND OF THE INVENTION

In recent years, flat panel display devices have been developed and widely used in electronic applications such as personal computers. One of such devices is a field emission display (FED) device that overcomes some of the limitations of liquid crystal displays and provides significant advantages over the traditional LCD devices. For instance, the field emission display devices have higher contrast ratio, larger viewing angle, higher maximum brightness, lower power consumption and a wider operating temperature range when compared to a conventional thin film transistor liquid crystal display panel.

One of the most drastic difference between a FED and a LCD is that, unlike the LCD, FED produces its own light source utilizing colored phosphor. The FEDs do not require complicated, power-consuming backlights and filters and as a result, almost all the light generated by a FED is visible to the user. Furthermore, the FEDs do not require large arrays of thin film transistors, and thus, a major source of high cost and yield problems for active matrix LCDs is eliminated.

In a FED, electrons are emitted from a cathode and impinge on a fluorescent coating layer, such as a phosphor layer on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate attracts electrons from the cathode and accelerates them toward the phosphor coating. The image produced by the phosphor coating is therefore largely dependent on the quality and the uniformity of the phosphor coating. The process for coating a phosphor layer on a transparent glass plate is therefore an important step in the total fabrication process of a FED.

Conventionally, the coating of a fluorescent powder layer on a flat transparent plate (or on a flat bulb) is accomplished by either a screen printing or a dip coating process. In either process, the screen printing paste or the dip coating emulsion contains a large amount of solvent which is used in forming the paste or the emulsion. After a paste is printed on a glass plate or after a glass plate is dip coated in an emulsion, the glass plate must be oven baked to evaporate all the solvent. The screen printing and the dip coating process are therefore not only complicated fabrication processes, but also processes that generate pollution for the environment for release of evaporated solvent into the atmosphere. The complicated fabrication process further result in a low throughput of the device fabricated.

It is therefore an object of the present invention to provide an apparatus for coating a fluorescent powder on a flat panel that does not have the drawbacks or shortcomings of the conventional apparatus.

It is another object of the present invention to provide an apparatus for coating a fluorescent powder on a flat panel that operates on an electrostatic coating principle.

It is a further object of the present invention to provide an apparatus for coating a fluorescent powder on a flat panel electrostatically that utilizs gas flames for heating the panel and negatively charging the panel.

It is another further object of the present invention to provide an apparatus for coating a fluorescent powder on a flat panel that is capable of rotating a flat panel mounted on a powder spray chamber during the electrostatic coating process.

It is still another object of the present invention to provide an apparatus for coating a fluorescent powder on a flat panel that is capable of heating the panel to a temperature of at least 100° C. and simultaneously charging the panel with a negative voltage of at least 20,000 volts.

It is yet another object of the present invention to provide an apparatus for coating a fluorescent powder on a flat panel that is capable of electrostatically coating the powder on a panel that is electrically non-conductive.

It is still another further object of the present invention to provide a method for coating a fluorescent powder on a flat panel by simultaneously heating a glass panel to a high temperature and negatively charging the panel to a high negative voltage and directing positively charged powder particles at the panel surface.

It is yet another further object of the present invention to provide a method for coating a fluorescent powder on a flat panel by simultaneously heating, rotating and negatively charging the panel and directing positively charged powder particles under a high air pressure toward the panel surface.

SUMMARY OF THE INVENTION

In accordance with the present invention, an apparatus and a method for coating a fluorescent powder on a substantially flat panel are provided.

In a preferred embodiment, an apparatus for electrostatically coating powder on a panel is provided which includes a chamber that has a top opening, a bottom opening and a cavity contained therein, a panel positioned on top of the chamber substantially sealing the top opening, the panel has a bottom surface to be coated which is exposed in the top opening to the cavity, a heating means for heating the panel on a top surface opposite to the bottom surface and for electrically grounding the flat panel, a powder spray nozzle adapted for engaging the bottom opening of the chamber and for receiving a positive voltage forming a closed-loop circuit with the heating means, means for rotating the chamber and the panel positioned on the chamber, and high pressure means for flowing a powder through the spray nozzle and for charging the powder with a positive electrostatic charge such that the powder is attracted toward the negatively charged bottom surface of the panel.

The apparatus for electrostatically coating powder on a flat panel may further include a chamber that has a columnar shape with a diameter at the top larger than a diameter at the bottom. The apparatus may further include a chamber fabricated of glass that is capable of withstanding a temperature of at least 100° C. The panel may be a glass panel for coating a fluorescent powder thereon. The panel may be a glass panel for fabricating a flat panel display device. The apparatus may further include a heating means that includes a plurality of gas nozzles for forming a layer of gas flame when ignited. The apparatus may further include a heating means that includes a plurality of gas nozzles for heating the panel to a temperature between about 100° C. and about 250° C., and preferably between about 100° C. and about 200° C.

The apparatus for electrostatically coating powder on a panel may furter include a heating means that includes a plurality of gas nozzles for heating the panel and for providing electrical conductance to the panel such that the panel may be grounded. The powder spray nozzle may further include a multiplicity of apertures for passing powder therethrough, the multiplicity of apertures may each have a passageway formed at an angle between about 0° and about 45° when measured from a vertical axis. The positive voltage received by the powder spray nozzle is between about 20,000 volts and about 50,000 volts.

The apparatus for electrostatically coating powder on a panel may further include a rotor member engaging the chamber for providing a rotational motion of the chamber at between about 1 RPM and about 20 RPM. The apparatus may further include a gas supply tank for delivering a flammable gas to the heating means. The apparatus may further include a powder recovery unit for recovering powder that does not stick to the bottom surface of the panel from the chamber cavity, the powder recovery member is situated juxtaposed to the powder spray nozzle. The high pressure means flows a powder through the powder spray nozzle at a pressure between about 0.8 kg/cm$^2$ and about 8 kg/cm$^2$. The apparatus may further include a powder supply means for delivering a powder to the spray nozzle under a compressed air pressure, the powder supply means may further include an agitation means for insuring a free flow of the powder.

The present invention is further directed to a method for electrostatically coating a powder on a panel that includes the steps of first providing a powder spray chamber that has a top opening for engaging a panel to be coated thereon and for exposing a first surface of the panel to be coated to a cavity in the chamber, heating the panel on a second surface opposite to the first surface with a gas flame to at least 100° C. and simultaneously charging the second surface with a negative voltage of at least 20,000 volts, rotating the chamber with the panel on top by a rotating means, and injecting a positively charged powder into the cavity by air pressure through a bottom opening of the chamber such that powder is attracted towards and adheres to the negatively charged first surface of the panel.

The method for electrostatically coating a powder on a panel may further include the step of heating the panel with a gas flame from a plurality of gas nozzles positioned juxtaposed to the second surface of the panel until a temperature between about 100° C. and about 250° C. is reached. The method may further include the step of rotating the chamber with a rotating means which frictionally engaging the powder spray chamber at a rotational speed between about 1 RPM and about 20 RPM. The method may further include the step of charging the second surface of the panel with a negative voltage between about 20,000 volts and about 50,000 volts. The method may further include the step of injecting the positively charged powder into the chamber by an air pressure of at least 0.8 kg/cm$^2$.

The method for electrostatically coating a powder on a flat panel may further include the step of injecting the positively charged powder that is charged with a voltage of at least 20,000 volts into the cavity. The method may further include the step of injecting the powder through a powder spray nozzle equipped with a plurality of apertures. The method may further include the step of supplying the powder from a powder supply hopper equipped with a stirrer. The method may further include the step of recovering unused powder from the chamber cavity for recycling.

DETAILED DESCRIPTION OF THE PREFERRED EMBODIMENT

The present invention discloses an apparatus and a method for coating a fluorescent powder on a substantially flat panel that is electrically non-conductive. In the apparatus, a novel heating apparatus is utilized for heating the panel and for negatively charging the panel simultaneously such that positively charged powder particles can be attracted and adhered to the panel.

The present invention is provided to eliminate the drawbacks of the conventional coating methods which involve time-consuming processing steps and environmentally polluting solvents. The method utilizes an electrostatic coating principle wherein a high voltage current and a gas flame are utilized to change the electric characteristics of a non-conductive substrate such that it becomes conductive for the electrostatic coating process.

The present invention novel method effectively reduces or eliminates the use of organic solvents in a paste or in an emulsion and furthermore, increases the throughput of a fabrication process. The present invention novel method is therefore especially suited for a mass production process that can be carried out at low cost.

The present invention novel method can be carried out by first heating a glass substrate, and then charging the substrate with a high voltage through the ions contained in the gas flame such that a negative electrostatic charge is produced on the glass substrate. A positively charged fluorescent powder, such as phosphor is then injected toward the glass plate by high pressure compressed air through a powder spray nozzle for coating the glass substrate. The uniformity and the thickness of the coating layer obtained can be determined by adjusting the high pressure air flow.

In a flat panel display device, a small amount of an inert gas is charged into a sealed cavity between two flat plates, after a high voltage is inputted at the two extreme ends of the cavity, a UV radiation is emitted from the inert gas. The UV radiation activates the fluorescent powder coated surfaces of the two flat plates such that the UV frequency is transformed into visible light frequency by the fluorescent powder.

Figure 1:
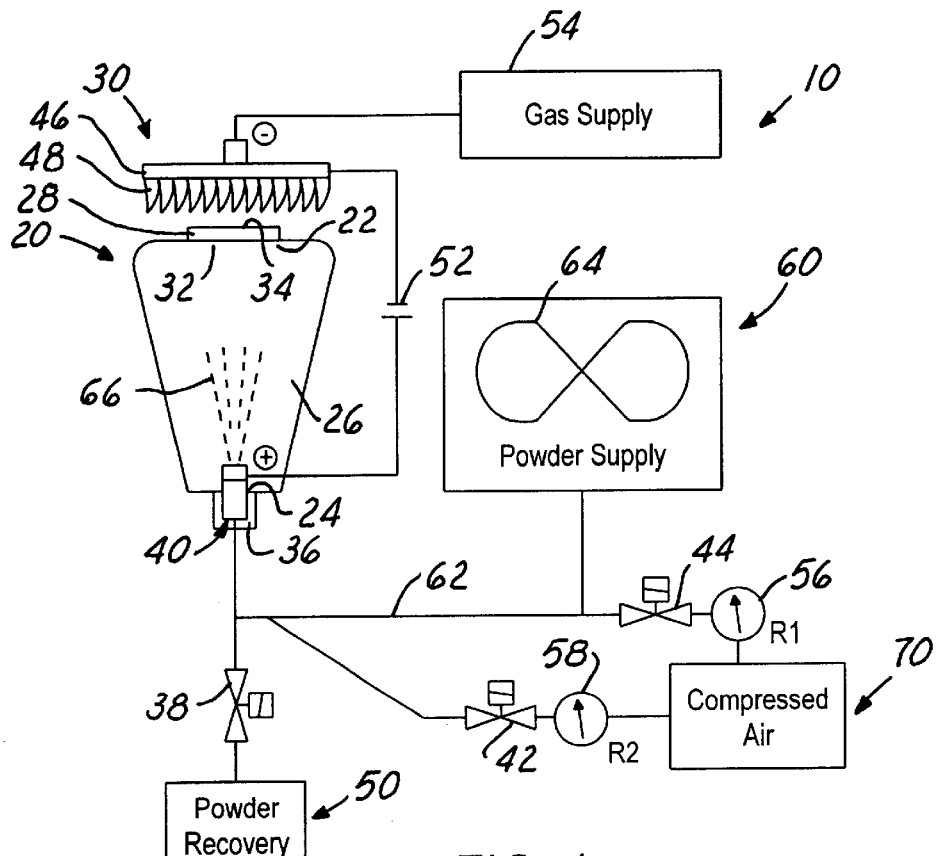
FIG. 1 is a graph illustrating the present invention apparatus for electrostatically coating a flat panel mounted on a powder spray chamber.

Referring initially to FIG. 1, wherein a present invention apparatus 10 for coating a fluorescent powder on a flat panel is shown. The apparatus 10 consists mainly of a powder spray chamber 20, a heating device 30, a powder spray nozzle 40 and a powder recovery unit 50. In the powder spray chamber 20, a top opening 22, a bottom opening 24 and a cavity 26 contained therein are provided. A substantially flat panel 28 with a surface 32 to be coated is positioned on the top opening 22 with the surface 32 facing the cavity 26. A powder spray nozzle 40 is engaged at the bottom opening 24 and substantially seals the bottom opening with a channel 36 for collecting unused powder and delivering to the powder recovery unit 50. Magnetic shut-off valves 38, 42 and 44 are further utilized to control the flow of the recovered powder and the flow of the powder being fed into the cavity 26, respectively.

The flat panel 28 which has a surface 32 to be coated, when positioned on the top opening 22, substantially seals the opening to form an air tight enclosure for cavity 26. On the uncoated side 34 of the flat panel 28, a heating device 30 which consists of a brass plate 46 and a multiplicity of gas nozzles 48 are utilized to supply heat thereto. A multiplicity of gas flames are generated from the multiplicity of gas nozzles 48 such that a uniformly distributed heat can be applied on the panel surface 34.

Simultaneously, a negative voltage of between about 20,000 volts and about 50,000 volts is applied to the brass plate 46 by a power source 52. A flammable gas is supplied from the gas supply 54 into the multiplicity of gas nozzles 48 for heating the flat panel 28. A suitable flammable gas for use in the present invention novel apparatus is propane.

To practice the present invention novel method, the flat panel 28 should be heated to a temperature of between about 100° C. and about 250° C., and preferably between about 100° C. and about 200° C. to carry out the electrostatic coating process. The voltage utilized from the power source 52 should be between about 20,000 volts and about 50,000 volts, and preferably between about 30,000 volts and about 40,000 volts.

The powder spray chamber 20 can be constructed in a columnar shape with a larger diameter at the top and a smaller diameter at the bottom. A suitable size for the chamber is approximately 6 inches in height and 3 inches in diameter measured at the center of the chamber.

A powder supply hopper 60 is utilized to supply a powder coating material to the input line 62 and then into the powder spray nozzle 40. The powder supply hopper 60 is equipped with a stirrer 64 for insuring an uninterrupted flow of powder through the input conduit 62. The feeding of powder is made possible by a high pressure compressed air source 70 which is capable of supplying an air pressure of between about 0.8 kg/cm² and about 8 kg/cm². The input conduit 60 utilized may have a diameter of about 10 mm. The flow of the compressed air from source 70 can be controlled by a magnetic shut-off valve 44 by reading the pressure gauge 56. The pressure indicated on the pressure gauge 56 is R1, while the pressure indicated on the pressure gauge 58 is R2. As shown in FIG. 1, the R1 pressure is controlled to feed powder from the powder supply hopper 60 into the input conduit 62, while the R2 pressure is used to feed powder from input conduit 62 into the powder spray nozzle 40. The powder spray nozzle 40 is equipped with a multiplicity of apertures (not shown) such that fine particles 66 of the powder can be injected into the cavity 26. The plurality of apertures provided in the powder spray nozzle 40 are normally formed at an angle of between about 0° and about 45° when measured from A vertical axis such that powder particles 66 may be sprayed out in a fan pattern toward the flat panel 28.

It should be noted that, during the electrostatic coating process, the flat panel 28 is first heated to a temperature of at least 100° C. and simultaneously, charged with a negative voltage of at least 20,000 volts such that an electrostatic charge is produced in the flat panel 28. The flat panel 28, as shown in FIG. 1A, is further rotated at a rotational speed of between about 1 RPM and about 10 RPM by a mechanism shown in FIG. 1A.

Figure 1A:
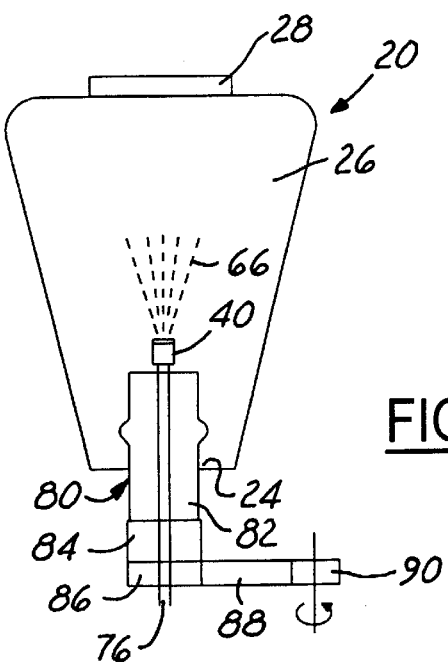
FIG. 1A is an enlarged, cross-sectional view of the powder spray chamber of FIG. 1 illustrating the rotating mechanism for the chamber.

As shown in FIG. 1A, in order to advantageously rotate the flat panel 28 during the coating process, the powder spray chamber 20 is first mounted on a rotor member 80 which consists of a silicon rubber coated collar 82 for frictionally engaging the bottom opening 24 of the chamber 20, a sleeve 84 into which the silicon rubber coated collar 82 is mounted, and a pulley 86 which is driven by a belt 88 by an electric motor 90. The powder spray chamber 20 frictionally engages the silicon rubber coated collar 82 and rotates with the collar 82 at a suitable rotational speed between about 1 RPM and about 10 RPM during the electrostatic coating process.

It should be noted that the powder spray nozzle 40 is mounted on a fixed shaft 76 and thus does not rotate with chamber 20 during the electrostatic spraying process. As shown in FIG. 1, the unused powder, i.e., the powder which does not adhere to the surface 32 of the flat panel 28, is collected by the recovery channel 36, controlled by the magnetic shut-off valve 38 into a powder recovery unit 50 by a vacuum force provided (not shown). After each spray coating process, magnetic shut-off valves 42 and 44 are closed, while the magnetic shut-off valve 38 is opened to recover the unused powder from the chamber cavity 26.

Each of the electrostatic coating process takes approximately between about 1 second and about 5 seconds, and preferably between about 1 second and about 2 seconds. A suitable coating thickness obtained on the flat panel 28 is between about 10 $\mu$m and about 50 $\mu$m, and preferably between about 20 $\mu$m and about 40 $\mu$m. In the powder material stored in the powder supply hopper 60, less than 5 wt % of a flow enhancer is also added to insure the free flow of powder through the input conduit 62 to the powder spray nozzle 40 under air pressure. A suitable particle size of the powder used is between about 1 $\mu$m and about 20 $\mu$m and preferably between about 3 $\mu$m and about 7$\mu$m. A frequently used fluorescent powder material is of the phosphor type. The size of the flat panel coated in the illustration shown in FIG. 1 is normally between about 2 inches and about 5 inches in length on adjacent sides.

Figure 2:
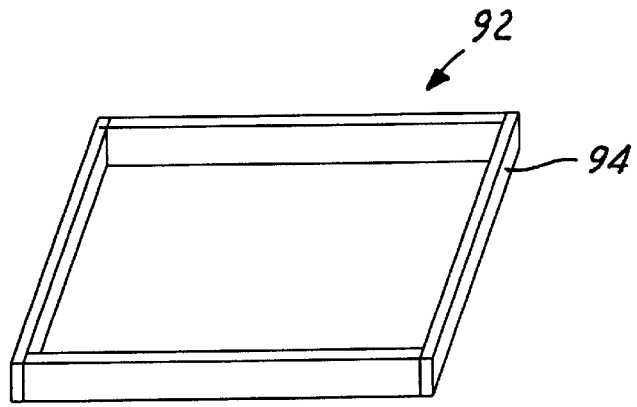
FIG. 2 is a perspective view of a flat panel that is provided with a side frame.
Figure 3:
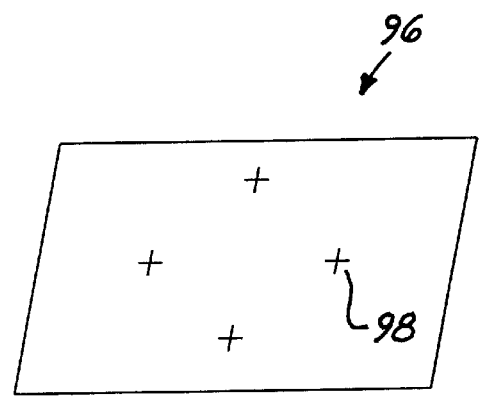
FIG. 3 is a perspective view of a flat panel that is provided with spacers mounted on the surface of the panel.

FIGS. 2 and 3 illustrate the types of flat panels that can be suitably processed by the present invention novel apparatus shown in FIGS. 1 and 1A. For instance, FIG. 2 shows a flat panel 92 that is equipped with a frame member 94, while FIG. 3 illustrates a flat panel 96 which is equipped with spacers 98. Neither of these panels 92, 96 can be processed in a conventional apparatus for screen printing. While a dip coating method is not only time consuming, but also environmentally hazardous due to the evaporation of solvents contained in the coating material.

Figure 4:
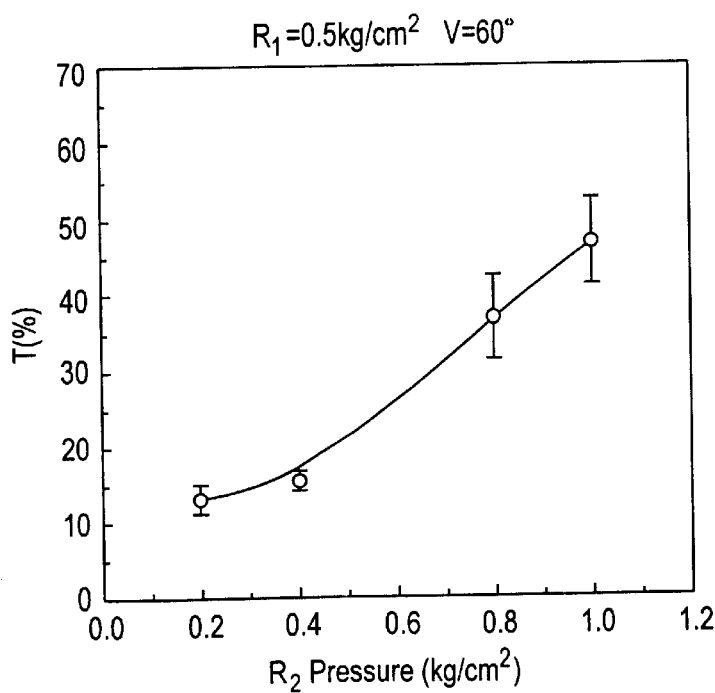
FIG. 4 is a graph illustrating the dependence of percent transmittance on the air pressure used for injecting powder into the chamber.

In operating the present invention novel apparatus, the dependency of percent transmittance through the coating layer on the air pressure (R2) for feeding into the chamber cavity is shown in FIG. 4. When the air pressure is formed at 0.5 kg/cm² with the apertures in the powder spray nozzle maintained at 60° angle, the percent transmission increases with an increase in R2 pressure. This is indicative of the fact that a thinner coating is formed on the flat panel surface which causes an increase in the percent transmission. At higher R2 pressures, lesser coating material is being coated on the panel surface since the powder is being blown into a more scattered pattern.

Figure 5:
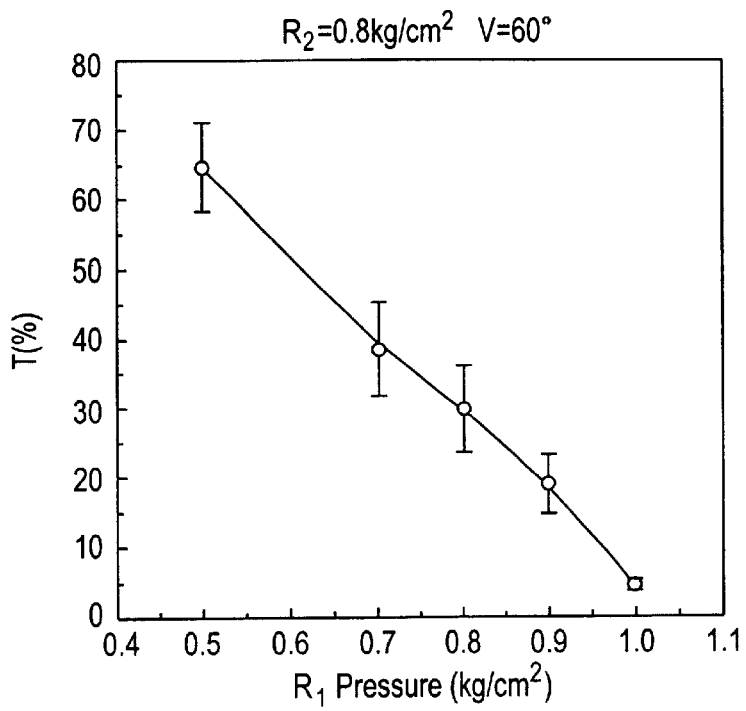
FIG. 5 is a graph illustrating the dependence of light transmittance on the air pressure for blowing powder from a powder supply hopper into the powder supply line to the chamber when the apertures in the powder spray nozzle are formed at 60°.
Figure 6:
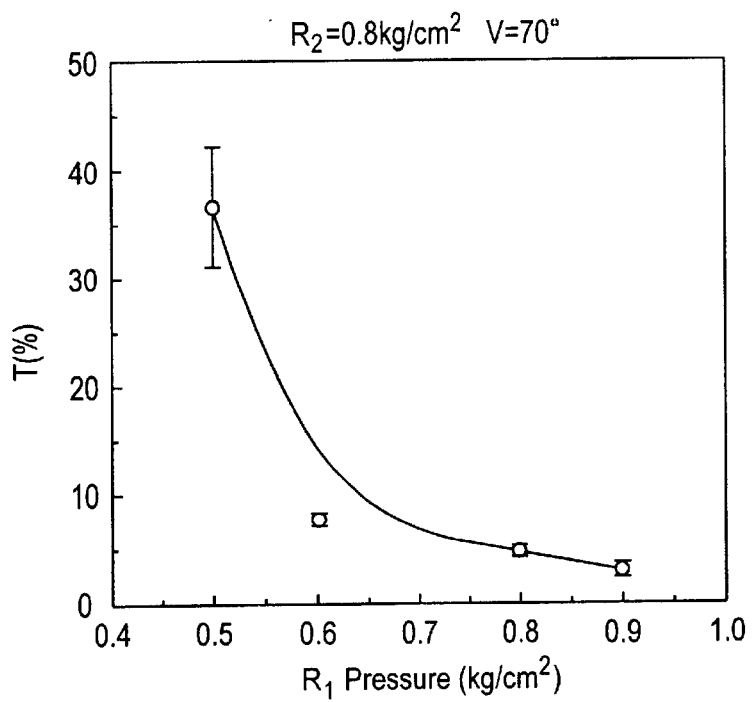
FIG. 6 is a graph illustrating the dependence of light transmittance on the air pressure used for feeding powder from a powder supply hopper into the supply line to the chamber when the apertures in the powder spray nozzle are formed at 70°.

FIGS. 5 and 6 shows an effect that is contrary to that shown in FIG. 4 when the R1 pressure (the pressure for carrying powder from the powder supply hopper) is increased. FIG. 5 illustrates data obtained when the R2 pressure is kept constant at 0.8 kg/cm² with the apertures at 60° angle. FIG. 6 is obtained from data with the R2 pressure kept constant at 0.8 kg/cm² while the aperture angle at 70°. It is assumed that more powder material is carried by higher R1 pressure into the cavity, resulting in a heavier coating being formed on the flat panel surface, and thus the percent transmission decreases accordingly. The dependency is different for two powder spray nozzles which have different aperture angles, i.e., 60° and 70°.

The present invention novel apparatus and a method for using the apparatus have therefore been amply described in the above descriptions and in the appended drawings of FIGS. 1~6.

While the present invention has been described in an illustrative manner, it should be understood that the terminology used is intended to be in a nature of words of description rather than of limitation.

Furthermore, while the present invention has been described in terms of a preferred embodiment, it is to be appreciated at those skilled in the art will readily apply these teachings to other possible variations of the inventions.

The embodiment of the invention in which an exclusive property or privilege is claimed are defined as follows:

1. A apparatus for electrostatically coating powder on a panel comprising:
   a chamber having a top opening, a bottom opening and a cavity contained therein,
   a panel positioned on top of said chamber substantially sealing said top opening, said panel having a surface to be coated exposed in said top opening to said cavity,
   a heating means for heating said panel on a top surface opposite to said bottom surface and for electrically grounding said flat panel,
   a powder spray nozzle adapted for engaging said bottom opening of the chamber and for receiving a positive voltage forming a circuit with said heating means,
   means for rotating said chamber and said panel positioned on said chamber, and
   high pressure means for flowing a powder through said spray nozzle and for charging said powder with a positive electrostatic charge such that said powder being attracted toward said negatively charged bottom surface of the panel.

2. An apparatus for electrostatically coating powder on a panel according to claim 1 further comprising a chamber in a columnar shape having a diameter at the top larger than a diameter at the bottom.

3. An apparatus for electrostatically coating powder on a panel according to claim 1 further comprising a chamber fabricated of glass that is capable of withstanding a temperature of at least 100° C.

4. An apparatus for electrostatically coating powder on a panel according to claim 1, wherein said panel is a glass panel for coating a fluorescent powder thereon.

5. An apparatus for electrostatically coating powder on a panel according to claim 1, wherein said panel is a glass panel for fabricating a flat panel display device.

6. An apparatus for electrostatically coating powder on a panel according to claim 1 further comprising a heating means of a plurality of gas nozzles for forming a layer of gas flame when ignited.

7. An apparatus for electrostatically coating powder on a panel according to claim 1 further comprising a heating means of a plurality of gas nozzles for heating said panel to a temperature between about 100° C. and about 250° C.

8. An apparatus for electrostatically coating powder on a panel according to claim 1 further comprising a heating means of a plurality of gas nozzles for heating said panel to a temperature between about 100° C. and about 200° C.

9. An apparatus for electrostatically coating powder on a panel according to claim 1 further comprising a heating means of a plurality of gas nozzles for heating said panel and for providing electrical conductance to said panel such that the panel is grounded.

10. An apparatus for electrostatically coating powder on a panel according to claim 1, wherein said powder spray nozzle comprises a multiplicity of apertures for passing powder particles therethrough.

11. An apparatus for electrostatically coating powder on a panel according to claim 1, wherein said powder spray nozzle comprises a multiplicity of apertures each having a passageway formed at an angle between about 0° and about 45° when measured from a vertical axis.

12. An apparatus for electrostatically coating powder on a panel according to claim 1, wherein said positive voltage received by said powder spray nozzle is between about 20,000 volts and about 50,000 volts.

13. An apparatus for electrostatically coating powder on a panel according to claim 1 further comprising a rotor member engaging said chamber for providing a rotational motion of said chamber between about 1 RPM and about 20 RPM.

14. An apparatus for electrostatically coating powder on a panel according to claim 1 further comprising a gas supply tank for delivering a flammable gas to said heating means.

15. An apparatus for electrostatically coating powder on a panel according to claim 1 further comprising a powder recovery means for recovering powder that does not stick to said bottom surface of the panel from said chamber cavity, said powder recovery member being situated juxtaposed to said powder spray nozzle.

16. An apparatus for electrostatically coating powder on a panel according to claim 1, wherein said high pressure means flows a powder through said powder spray nozzle at a pressure between about 0.8 kg/cm² and about 8 kg/cm².

17. An apparatus for electrostatically coating powder on a panel according to claim 1 further comprising a powder supply means for delivering a powder to said spray nozzle under compressed air, said powder supply means further equipped with an agitation means for insuring a free flow of powder.

* * * * *

UNITED STATES PATENT AND TRADEMARK OFFICE
CERTIFICATE OF CORRECTION

| | | |
|---|---|---|
| PATENT NO. | : 6,280,524 B1 | Page 1 of 1 |
| APPLICATION NO. | : 09/366910 | |
| DATED | : August 28, 2001 | |
| INVENTOR(S) | : Shih-Hsien Lin et al. | |

It is certified that error appears in the above-identified patent and that said Letters Patent is hereby corrected as shown below:

On the cover page item (75) Inventors: should read as follows:

Shih-Hsien Lin; Jen-Yun Huang; Kuang-Lung Tsai, all of Hsin-Chu (TW)

Signed and Sealed this

Twenty-third Day of August, 2011

David J. Kappos
*Director of the United States Patent and Trademark Office*